(12) United States Patent
Spencer et al.

(10) Patent No.: US 6,550,575 B2
(45) Date of Patent: Apr. 22, 2003

(54) UTILITY PERCH AND TRAILER

(75) Inventors: Christopher A. Spencer, 24 Broadview Dr., Ridgeland, SC (US) 29936; Victoria L. Smith, Ridgeland, SC (US)

(73) Assignee: Christopher A. Spencer, Ridgeland, SC (US)

( * ) Notice: Subject to any disclaimer, the term of this patent is extended or adjusted under 35 U.S.C. 154(b) by 0 days.

(21) Appl. No.: 09/929,104

(22) Filed: Aug. 15, 2001

(65) Prior Publication Data

US 2003/0034205 A1 Feb. 20, 2003

(51) Int. Cl.[7] .............................................. E04C 1/00
(52) U.S. Cl. ...................... 182/63.1; 182/127; 182/116; 296/35.3
(58) Field of Search .......................... 182/20, 22, 64.1, 182/63.1, 116, 127, 187; 296/35.3; 43/1

(56) References Cited

U.S. PATENT DOCUMENTS

| | | | |
|---|---|---|---|
| 478,841 A | * 7/1892 | Bodette | 182/63.1 X |
| 1,268,607 A | * 6/1918 | Pettis | 182/63.1 X |
| 2,371,092 A | 3/1945 | Williams | |
| 2,942,609 A | 6/1960 | Ferguson | |
| 3,406,784 A | 10/1968 | Jones et al. | |
| 3,556,249 A | * 1/1971 | Jackson | 182/63.1 |
| 4,274,508 A | 6/1981 | Hughes et al. | |
| 4,284,171 A | * 8/1981 | Owen | 182/22 |
| 4,442,919 A | * 4/1984 | Fulcher | 182/63.1 |
| 4,614,252 A | 9/1986 | Tarner | |
| 4,625,831 A | * 12/1986 | Rodgers, Jr. | 182/116 |
| 4,696,374 A | 9/1987 | Hale | |
| 5,042,614 A | 8/1991 | Rainey | |
| 5,295,556 A | 3/1994 | Mullin | |
| 5,297,844 A | 3/1994 | Haustein | |
| 5,314,042 A | * 5/1994 | Adams | 182/187 |
| 5,400,541 A | 3/1995 | Ennamorato et al. | |
| 5,409,081 A | * 4/1995 | Reeves | 182/63.1 |
| 5,433,291 A | 7/1995 | Shoestock, Sr. | |
| 5,881,839 A | 3/1999 | Stanley | |
| 5,887,676 A | 3/1999 | Harbin | |
| 5,927,435 A | * 7/1999 | Benton | 182/116 |
| 6,105,721 A | * 8/2000 | Haynes | 182/127 |
| 6,334,508 B1 | * 1/2002 | Shields | 182/116 |
| 6,347,684 B1 | * 2/2002 | Fath et al. | 182/63.1 |

FOREIGN PATENT DOCUMENTS

GB    2 082 980 A    3/1982

\* cited by examiner

Primary Examiner—Bruce A. Lev
(74) Attorney, Agent, or Firm—Litman Law Offices, Ltd.

(57) ABSTRACT

A combination apparatus for vehicles with or without an open bed comprising an elevated viewing perch or observation stand with a seat, a luggage/personnel carrier/kayak carrier, a pontoon boat, a fishing platform, and a farm plow. The viewing perch can be mounted on an open bed vehicle such as ATV's, trucks or the like vehicles and have a ladder-type frame on rear wheels. The frame can be used as a utility trailer for hauling equipment, game or an injured person, and readily converted to an elevated position and used as a viewing or hunting stand. The apparatus can be raised to the elevated position by hand or by a winch, can serve as a tent shelter with bunk-type cots placed inside, and can be wired for lighting, energized by the vehicle's battery.

20 Claims, 15 Drawing Sheets

STANDARD DOUBLE CARGO LIGHTS

AIR COMPRESSOR

UTILITY PERCH AND TRAILER

BACKGROUND OF THE INVENTION

1. Field of the Invention

The present invention relates generally to a combination utility trailer. More specifically, the invention is a convertible elevated observation stand, luggage/personnel/kayak carrier, tent, pontoon boat, and farm plow which can be mounted on or trailered by open bed vehicles such as ATV's, trucks or farm tractors.

2. Description of the Related Art

The related art of interest describes various hunting stands, tents, carts, and the like for towing by a vehicle, but none discloses the present versatile invention. There is a need for a convertible trailer for serving multiple uses. For connection to an open bed vehicle such as an ATV, a tent with inside lighting, a pontoon boat, a fishing platform, a kayak, a luggage and personnel carrier, and a hunting stand combination is provided. For a trailer converted to a farm plow, an ATV or a tractor can be used.

The relevant art will be discussed in the order of perceived relevance to the present invention.

U.S. Pat. No. 5,042,614 issued on Aug. 27, 1991, to Robert P. Rainey describes an adaptable hunting stand for use as a ladder against a tree or an A-frame and mountable on an ATV comprising a ladder-like frame which includes a leveling seat platform, ladder elements, quick-grasping base connector assemblies, and a ground support. Sleeves are required for joining the ladder parts. The apparatus is distinguishable for requiring joining sleeves.

U.S. Pat. No. 5,400,541 issued on Mar. 28, 1995, to Anthony Ennamorato et al. describes a tepee tent with a door for a tripod tree stand which is distinguishable for being limited to a free standing tent and tree stand not being convertible to any other apparatus.

U.S. Pat. No. 5,295,556 issued on Mar. 22, 1994, to Daniel J. Mullin describes a multipurpose hand-pulled hunting cart convertible between a two-wheeled cart, a sled, a tree stand, and a free standing deer-stand. The convertible cart is distinguishable for requiring two wheels and two angled L-shaped members.

The following patents each describe a mobile hunting stand positioned on a vehicle.

U.S. Pat. No. 5,881,839 issued on Mar. 16, 1999, to Cecil A. Stanley describes a mobile and collapsible hunting stand removably based in the bed of a pickup truck which is distinguishable for being limited to a hunting stand.

U.S. Pat. No. 5,297,844 issued on Mar. 29, 1994, to Herbert H. Haustein describes a removable cab and hunting stand apparatus based on an ATV with a stabilizer bar and ladder. The stand can be enclosed for weather protection with one openable window and latchable door. A foldable stand is positioned on top and includes a seat. Lighting can be provided inside. The apparatus is distinguishable for its limitation to a position on top of an ATV.

U.S. Pat. No. 4,696,374 issued on Sep. 29, 1987, to John E. Hale describes an ATV or motorcycle mounted portable hunting stand with a seat and rear support pedestals, which apparatus is distinguishable for being limited to mounting on an ATV or a three wheeled motorcycle for support.

U.S. Pat. No. 4,614,252 issued on Sep. 30, 1986, to David E. Tarner describes a portable observation structure removably attachable to the rear of an ATV comprising two pairs of upright front and rear legs, wherein the rear legs have telescopically extendable legs which extend to the ground. A notched planar seat is attached to a tree trunk by a belt. The apparatus is distinguishable for being limited to mounting on an ATV for support.

U.S. Pat. No. 3,406,784 issued on Oct. 22, 1968, to Glendale Jones et al. describes a portable hunting blind tower mountable on the cabin and bed of a pickup truck having a ladder accessible side covered blind having a square configuration and requiring clamps to secure the apparatus to the truck and portaged in an inclined position in the bed. The apparatus is distinguishable as being limited to a hunting blind on a pickup truck.

U.S. Pat. No. 4,274,508 issued on Jun. 23, 1981, to Tommy L. Hughes et al. describes a hunter outlook collapsible ladder seat positioned on a collapsible ladder secured by two staked guylines, and the seat protected by a triangular shaped transparent plastic tent. The apparatus is distinguishable for being limited to a staked down ladder.

U.S. Pat. No. 5,887,676 issued on Mar. 30, 1999, to Daniel H. Harbin describes an accessory kit for allowing use of a tree stand as a game carrier comprising a pair of handle bars attached to the hinged ends of a pair of support members pivotally mounted to a collapsible tree stand frame and supports wheels. The apparatus is distinguishable for being limited to a two-wheel loading cart.

U.S. Pat. No. 5,433,291 issued on Jul. 18, 1995, to Richard F. Shoestock, Sr. describes a combination tree stand and two-wheeled game carrier, wherein a two-piece tree stand discards the wheels for attaching to a tree. The apparatus is distinguishable for being limited to wheels added to a collapsible tree-stand to form a handcart.

The following patents are limited to either tents or mobile step ladders, and having no relation to hunting stands.

U.S. Pat. No. 2,942,609 issued on Jun. 28, 1960, to Elton O. Ferguson describes a collapsible car top tent which is distinguishable for being limited to a tent.

U.S. Pat. No. 2,371,092 issued on Mar. 6, 1945, to George G. Williams describes a scaffold-ladder combination, wherein the ladder portion can be collapsed below the scaffold portion. The apparatus is distinguishable for being limited to a folding ladder in a scaffold structure.

U.K. Patent Application No. 2 082 980 A published on Mar. 17, 1982, for Brian Pascall et al. describes a manually pushable wheeled step ladder which is distinguishable for its limited use.

None of the above inventions and patents, taken either singularly or in combination, is seen to describe the instant invention as claimed. Thus, a viewing perch among other utility apparatuses for open bed vehicles solving the aforementioned problems is desired.

SUMMARY OF THE INVENTION

The present invention is a convertible, elevated observation stand with a seat, luggage carrier, tent, kayak carrier and a pontoon boat which can be mounted on or trailered by open bed vehicles such as ATV's, trucks or the like vehicles. The ladder-type frame on wheels can be used as a utility trailer with a folding seat pivoted outside for hauling equipment, game or an injured person, and readily converted to an elevated position with a lifting system and used as a viewing or hunting stand. The apparatus can be raised to the elevated position by hand or by a winch, can serve as a tent shelter with bunk-type cots placed inside, and can be wired for lighting which is energized by the vehicle's battery. For conversion to a trailerable boat, the frame can be covered with waterproof liner, inflatable pontoons can be attached to each side, an additional seat added, and an electric motor mounted on the rear. A fishing platform still attached to the vehicle would not require the pontoons and engine. For carrying a kayak, the apparatus can include a pair of elevated racks. For forming a farm plow, the frame can support cultivator blades for towing by an ATV or a farm tractor. Skis can be attached to the frame for towing by a snowmobile.

Accordingly, it is a principal object of the invention to provide a combination apparatus trailerable by an open bed vehicle, a farm tractor or a snowmobile.

It is another object of the invention to provide a combination apparatus trailerable by an open bed vehicle and convertible to an elevated viewing or hunting stand, a tent, a carrier of luggage/injured personnel/game, and a pontoon boat.

It is a further object of the invention to provide a fishing platform still attached to the vehicle and maintained in shallow water.

Still another object of the invention is to provide a farm plow by adding an array of cultivator blades below the frame and towing by an ATV or a farm tractor.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
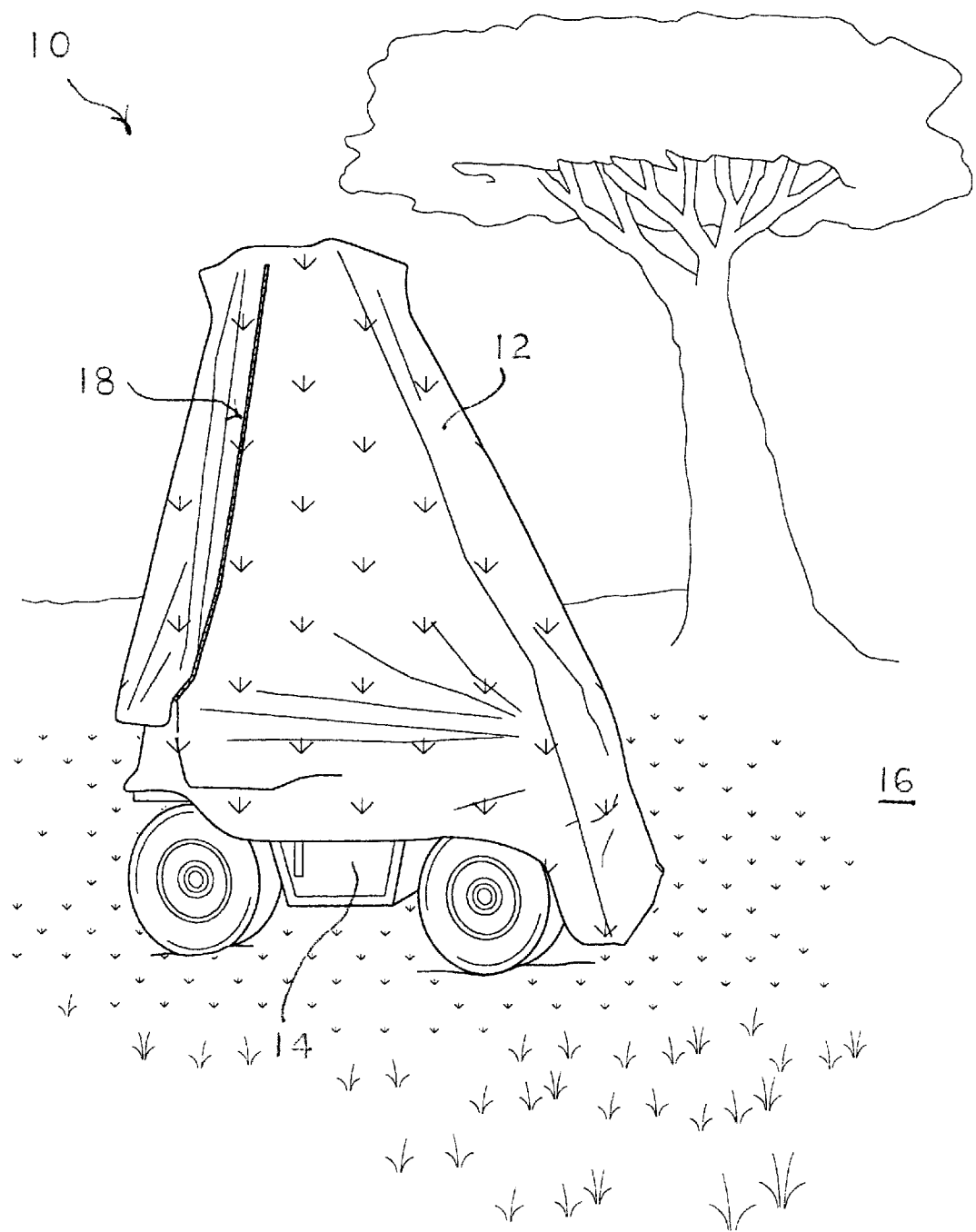
FIG. 1 is an environmental, perspective side view of a camouflaged viewing perch apparatus for open bed vehicles as a first embodiment mounted on an all-track vehicle (ATV) according to the present invention.

The present invention is directed to an apparatus capable of multiple utility. In a first embodiment illustrated in FIGS. 1, 2, 3, and 5, an elevated viewing perch 10 useful for hunting or observing wild animals is covered (as best seen in FIG. 1) by a camouflaged canvas tent cover 12 positioned on an all-track vehicle 14 (hereafter referred to as an ATV) in a country setting 16.

Figure 2:
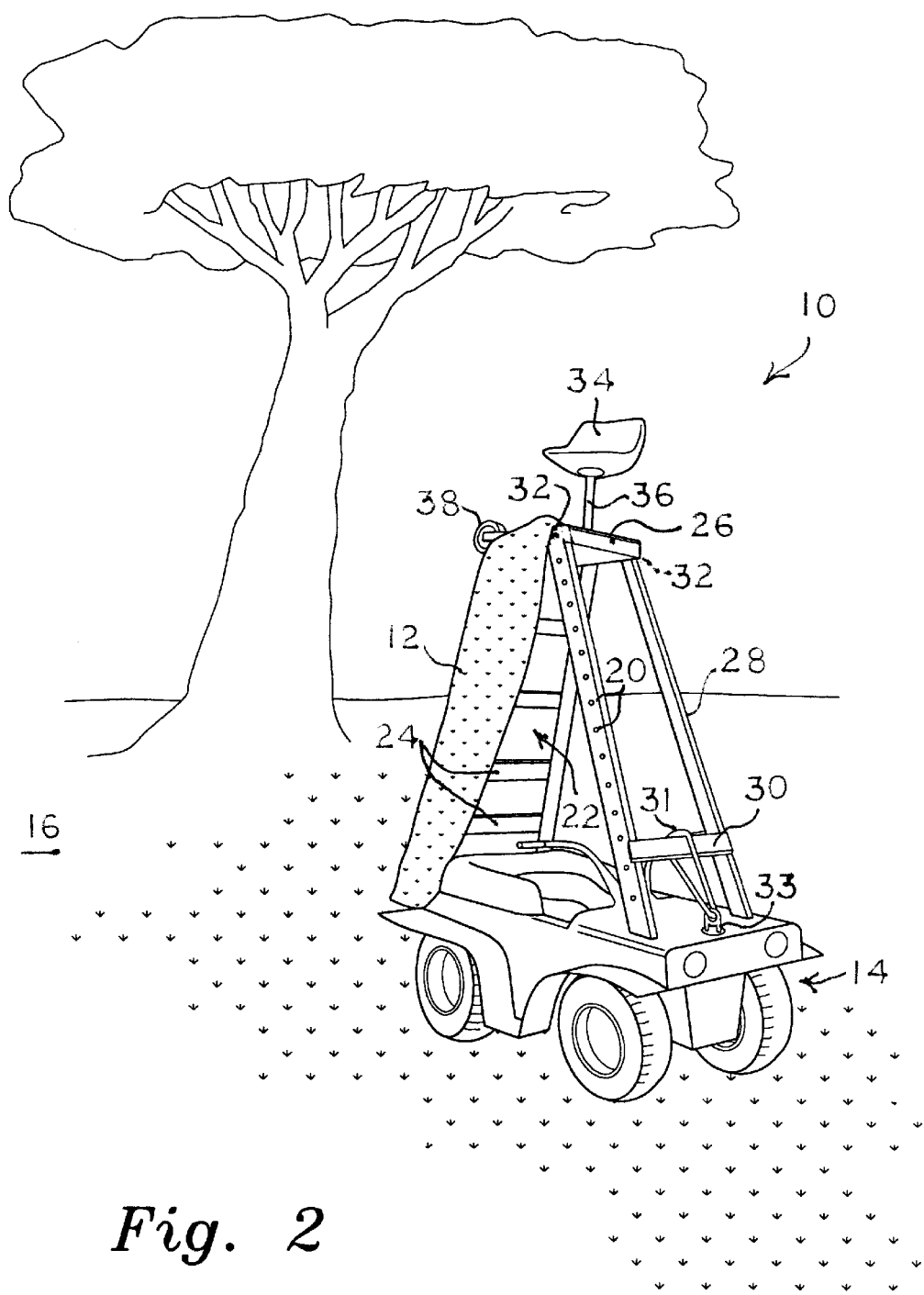
FIG. 2 is an environmental, perspective rear view of the uncovered viewing perch apparatus of FIG. 1.
Figure 3:
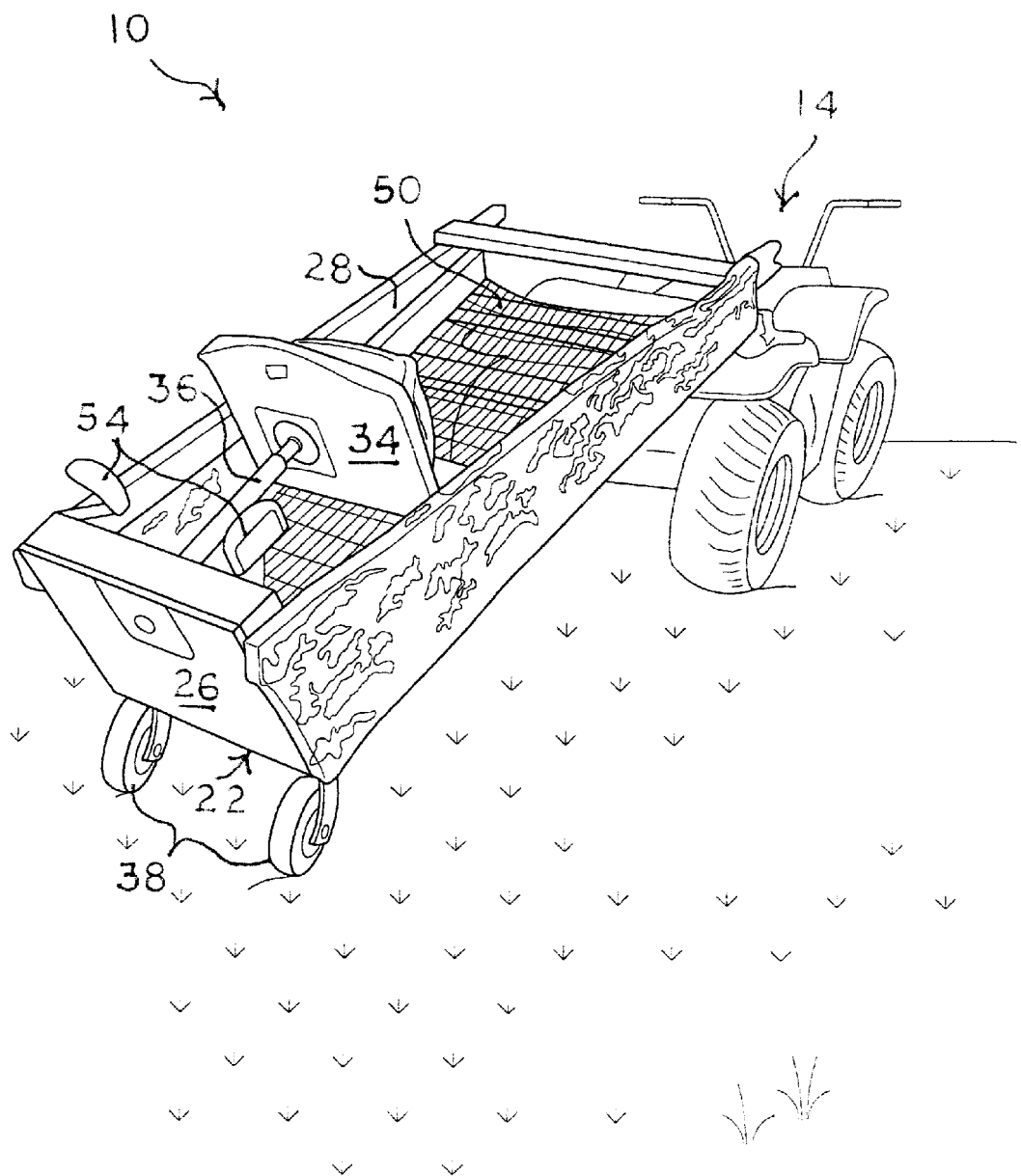
FIG. 3 is an environmental, perspective rear view of a folded viewing perch apparatus of FIG. 1 attached to an ATV for towing.

In FIG. 2, the cover 12 having a zippered opening 18 is opened, detached from its snap attachments 20, and gathered on one side to reveal the perch 10 having an A-frame structure with a ladder or base element 22 having steps 24 fixedly pinned in the rear, joined by a horizontal floor plate or platform element 26 to a front frame element 28 having a lower crossbar 30 and pivotable on a pin 32. A tiedown cord 31 is attached to the crossbar 30 and the vehicle's lug 33 to hold down the perch 10. The pin 32 permits the rotation of the front frame element 28 to fold proximate the ladder or base element 22 for towing by a hitch 92 which is hinged to the free ends of the base element 22 and has an inch square male receiver on each end as seen in FIG. 3 and in the subsequent embodiments.

Figure 5:
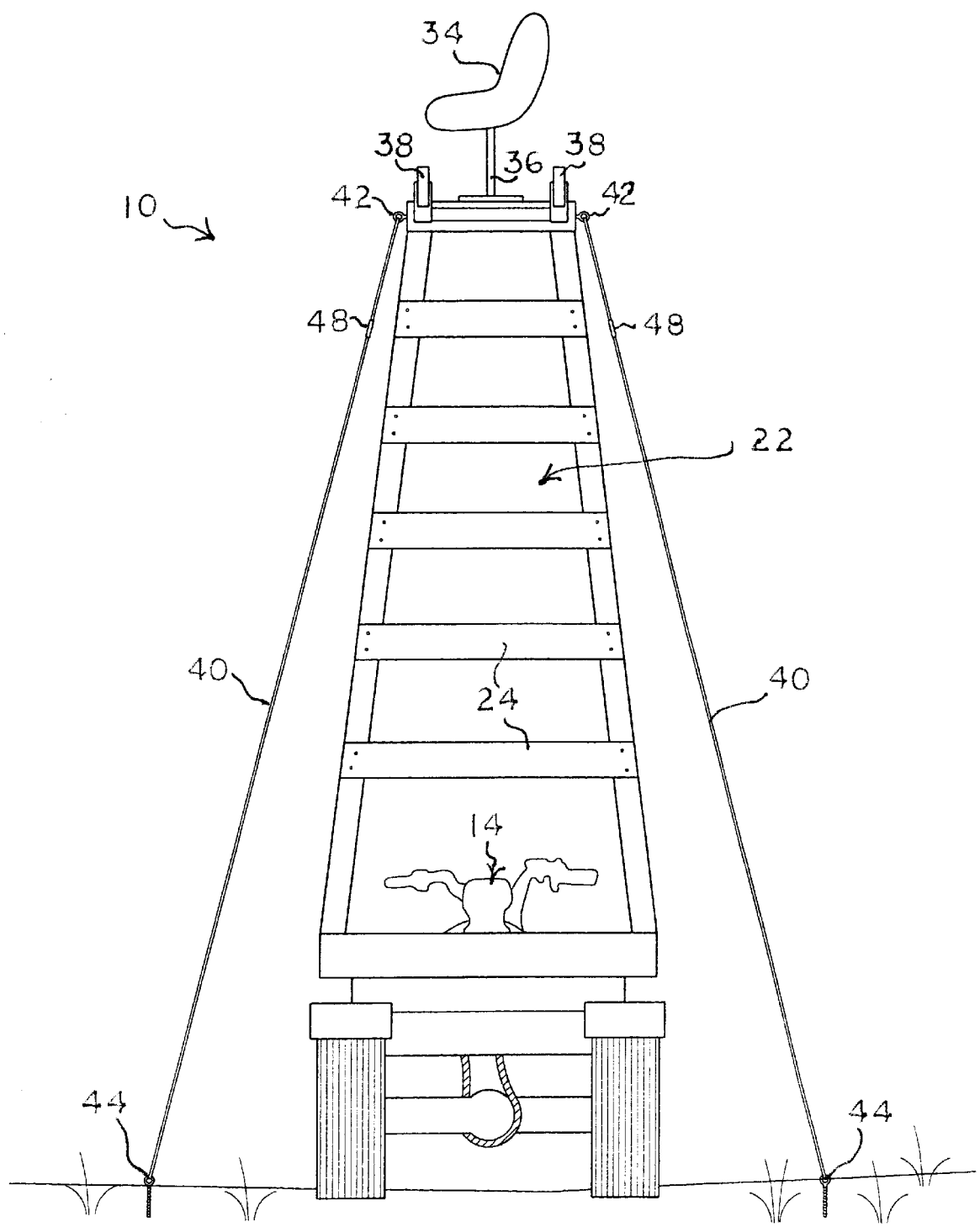
FIG. 5 is an environmental, rear elevational view of the uncovered viewing perch apparatus of FIG. 1 on the ATV and anchored to the ground by guys.

A folding chair 34 on a standard 36 is fastened to the floor plate element 26. A pair of water-immersible wheels 38 are, attached to the floor plate element 26. The notched feet portions of the ladder element 22 and the front frame element 28 are secured to the front and rear fender bar elements present on an ATV 14 by suitable brackets (not shown). Also, a pair of anchor straps 40 on the sides of the cover 12 are utilized to stabilize the perch 10 as shown in FIG. 5. A pair of ring pins 42 are attached to opposite sides of the floor plate 26 to secure the upper end of the anchor straps 40, and a pair of ringed anchor stakes 44 are attached to the opposite ends of each anchor strap 40 to place into the ground 46. A tie-down ratchet 48 is positioned on each anchor strap 40 to provide a taut anchor strap.

A foldable box frame covered with canvas on its sides (not shown) fastened by snaps 20 to the floor plate or platform 26 can be added to hide the hunter or observer when the camouflaged tent cover 12 is not used. Rope steps at the bottom of the frame on each side can have a looped rope step (not shown).

The basic frame is made of 2 inch by 4 inch aluminum tubing. The frame is 2 feet wide on top, 3 feet wide at the bottom and approximately 90 inches high when erected. The floor plate or platform element 26 can be made of treated 2 inch by 4 inch wood studs with plywood facing. The fasteners and pins are made of rustproof metal.

In FIG. 3, the perch 10 is folded, the pair of wheels 38 are extended down, and the floor area over the ladder or base element 22 is covered with a rigid galvanized iron mesh 50 with ¼ inch square apertures to form a bed area. A conventional air inflatable mattress (not shown) configured to fit the floor area can be used with the perch 10 utilized as a tent. The folded perch 10 has camouflaged canvas sides or skirts 52 (FIG. 11) which are snapped also onto the sides of the embodiment of FIGS. 9 and 10 to be discussed below. The chair 34 is folded and the perch 10 can then be towed.

A pair of exterior lamps 54, e.g., standard cargo lights, are shown here and also in FIG. 6 to be explained below in the lighting for the tent 60.

Figure 4:
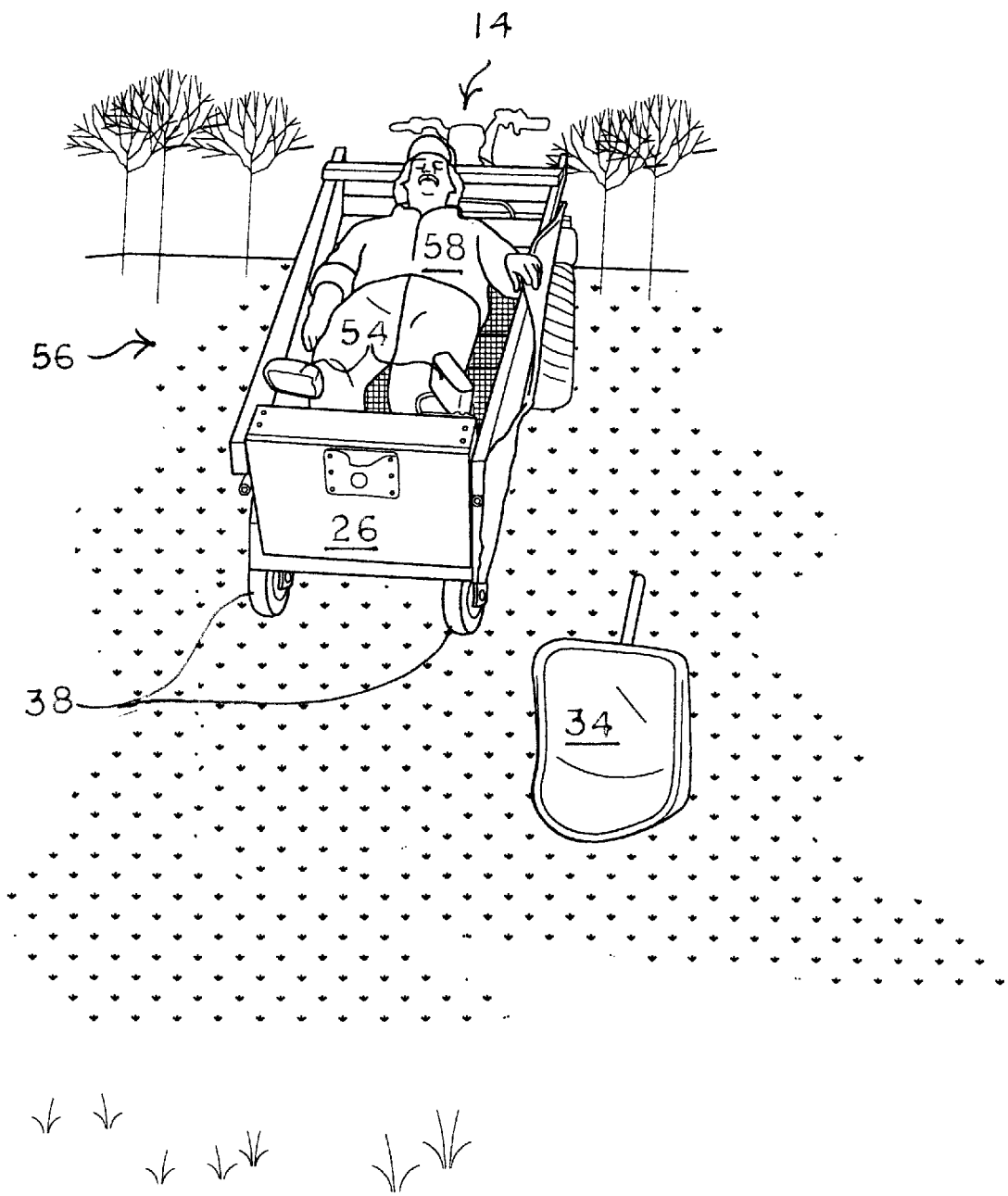
FIG. 4 is an environmental perspective rear view of an ATV towing a folded viewing perch apparatus carrying an injured person as a second embodiment with the seat positioned outside the apparatus.

In the second embodiment of a towable cart 56 illustrated in FIG. 4, an injured supine person 58 is being carried in the cart 56 with the chair 34 pivoted outside the cart, but shown separated for purposes of clarity of the cart 56.

Figure 6:
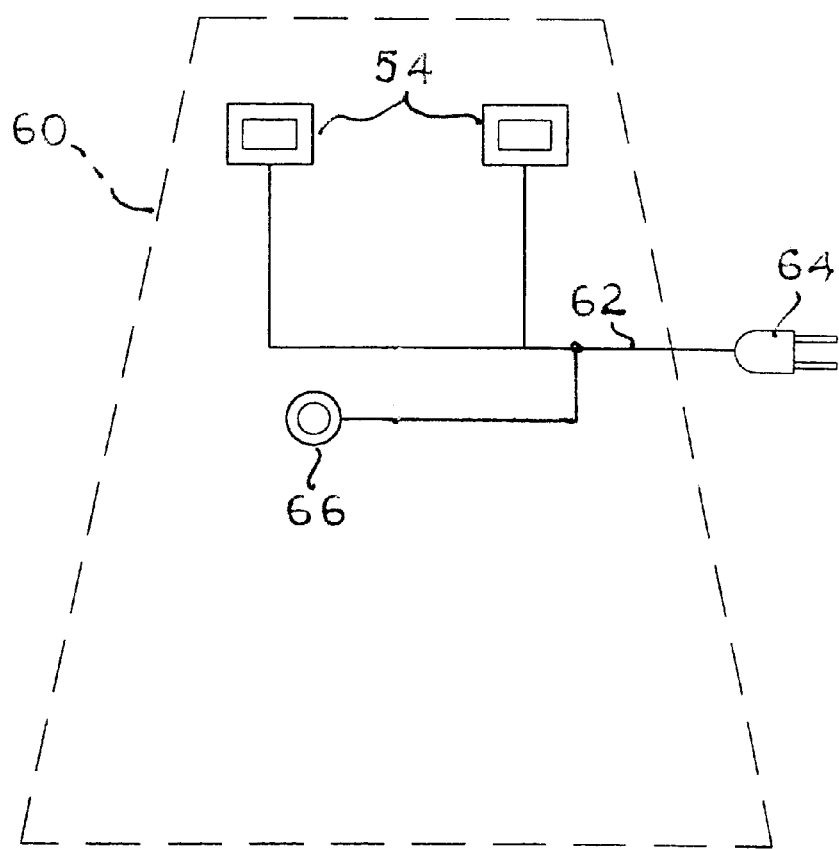
FIG. 6 is a schematic side elevational diagram of the electrical system utilized for bedding down as a third embodiment in the viewing perch apparatus shown in shadow and an air compressor connection for inflating an air mattress or pontoons.
Figure 6:
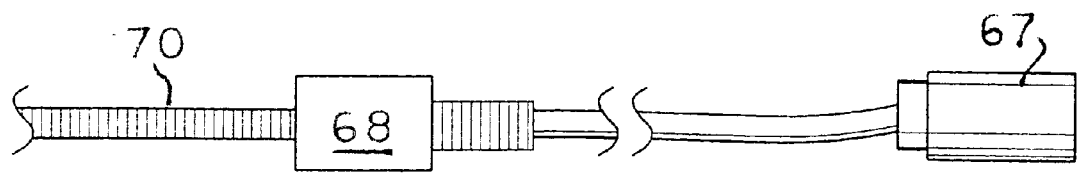

In a third embodiment depicted in FIG. 6, wherein a tent 60 shown schematically in shadow employs the aforementioned standard pair of cargo lamps 54 connected in parallel by an electrical wire 62 to a male electrical plug 64 and controlled by a separate switch 66. The lamps 50 can be 55 Watt bulbs operated by the vehicle's 12 Volt D.C. battery. The air compressor 68 connected to a hose 70 is operated by the vehicle's electrical system by female plug 67 to pressurize the air mattress used in the tent and the pontoons in a later boat embodiment.

Figure 7:
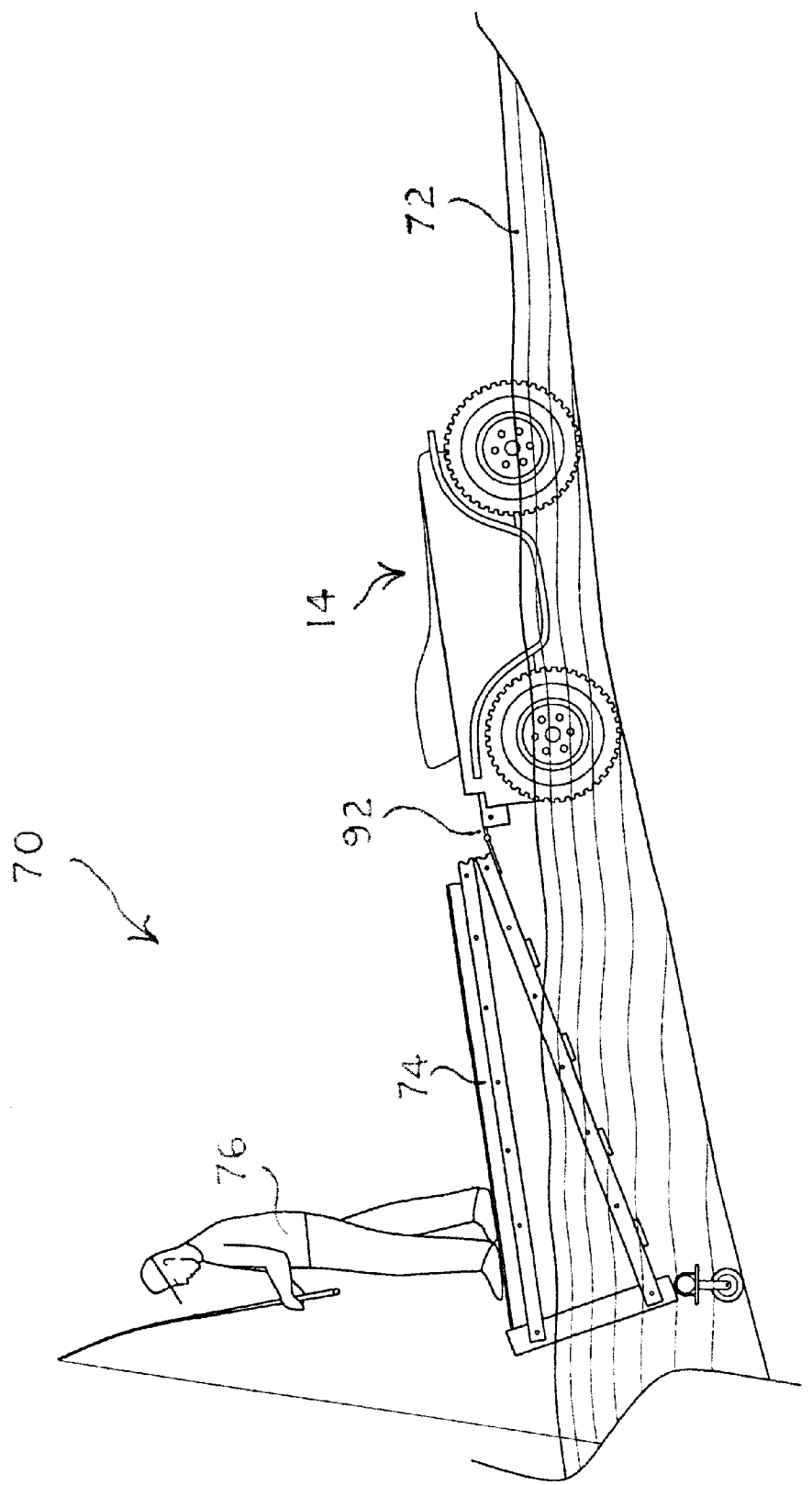
FIG. 7 is an environmental side elevational view of a fisherman on a fishing platform in shallow water with the platform attached to the vehicle as a fourth embodiment.

In the fourth embodiment depicted in FIG. 7, the bare framework is basically used as a dock 70 in shallow water 72 up to approximately 2 feet in depth and hitched to the ATV 14. A rigid wooden platform 74 configured in shape to overlap the dock 70 on top is secured by any means such as fasteners, clamps and the like. Thus, the fisherman 76 can back up into shallow water 72, hop on the dock 70 to fish, and hop back on the ATV 14 and move to another location. In this embodiment and in FIGS. 8 through 13 and 15, the pair of wheels 38 are supported on a 2.25 inch diameter pipe 130 by two pairs of U-bolts 132, and a swivelling wheel base 134 on each U-bolt to hold the wheels 38 in a wheel frame 136.

Figure 8:
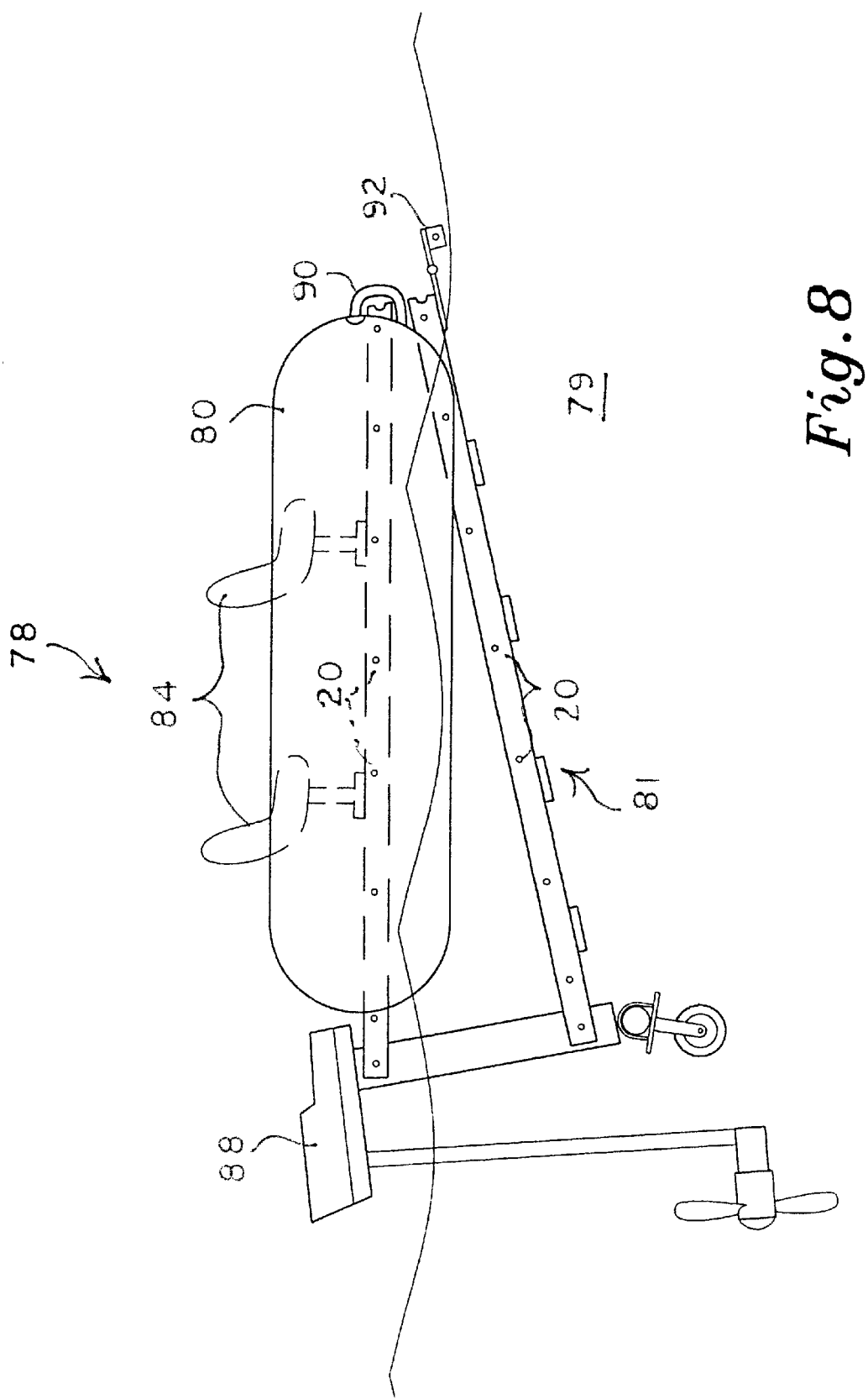
FIG. 8 is an environmental side elevational view of a fishing boat with side pontoons and an outboard motor in water without the side skirts as a fifth embodiment.
Figure 9:
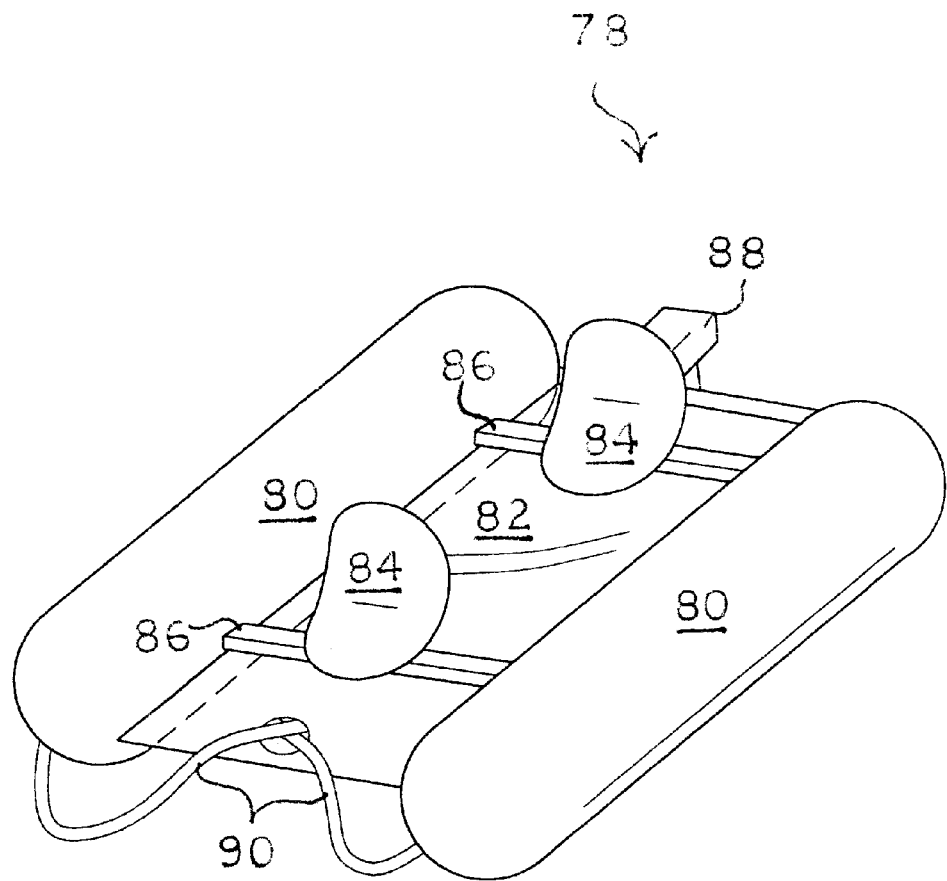
FIG. 9 is a front perspective view of the FIG. 8 fishing boat with pontoons, but omitting the boat frame.

In a fifth embodiment illustrated in FIGS. 8 and 9, a pontooned fishing boat 78 in deep water 79 is equipped with a pair of inflatable side pontoons 80 attached to the basic framework 81 (not shown in FIG. 9), lined on the bottom with a thick rubber liner 82 which keeps out the water 72 by suitable fastening. The canvas cover 12 (not shown) covers all sides except the top boat surface and attached by the snaps 20. Two chairs 84 are supported on crossbars 86. An electric battery (not shown) operated outboard trolling motor 88 is supported on the platform 26 now serving as a boat transom. An air hose 90 is available for pumping up the pontoons 80 with compressed air from the air compressor 68 shown in FIG. 6. This boat 78 on a pair of wheels 38 can be trailered with the hitch 92.

Figure 10:
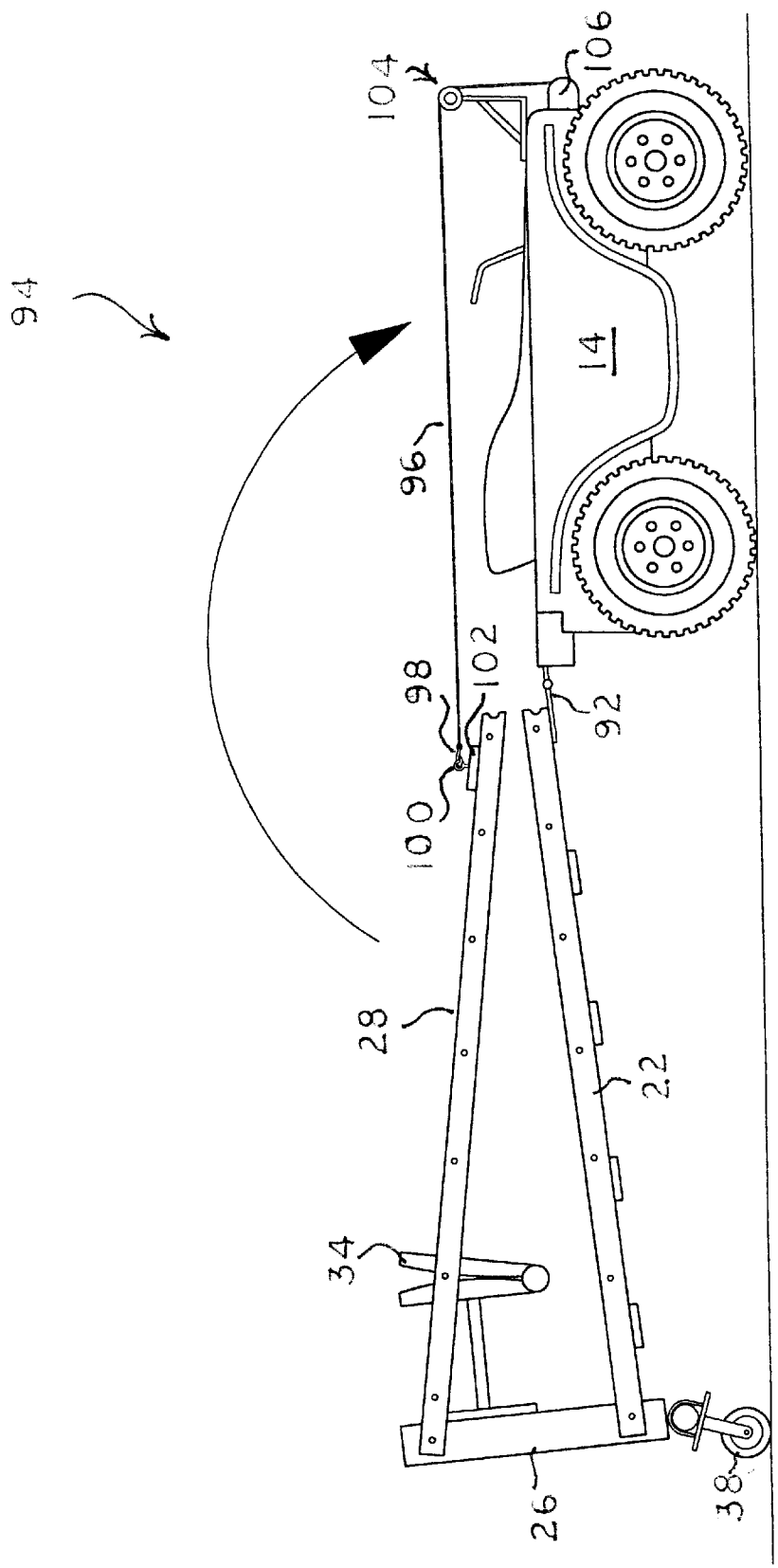
FIG. 10 is a schematic side elevational view of an ATV equipped with an hoisting element for elevating the viewing apparatus of the first embodiment.
Figure 11:
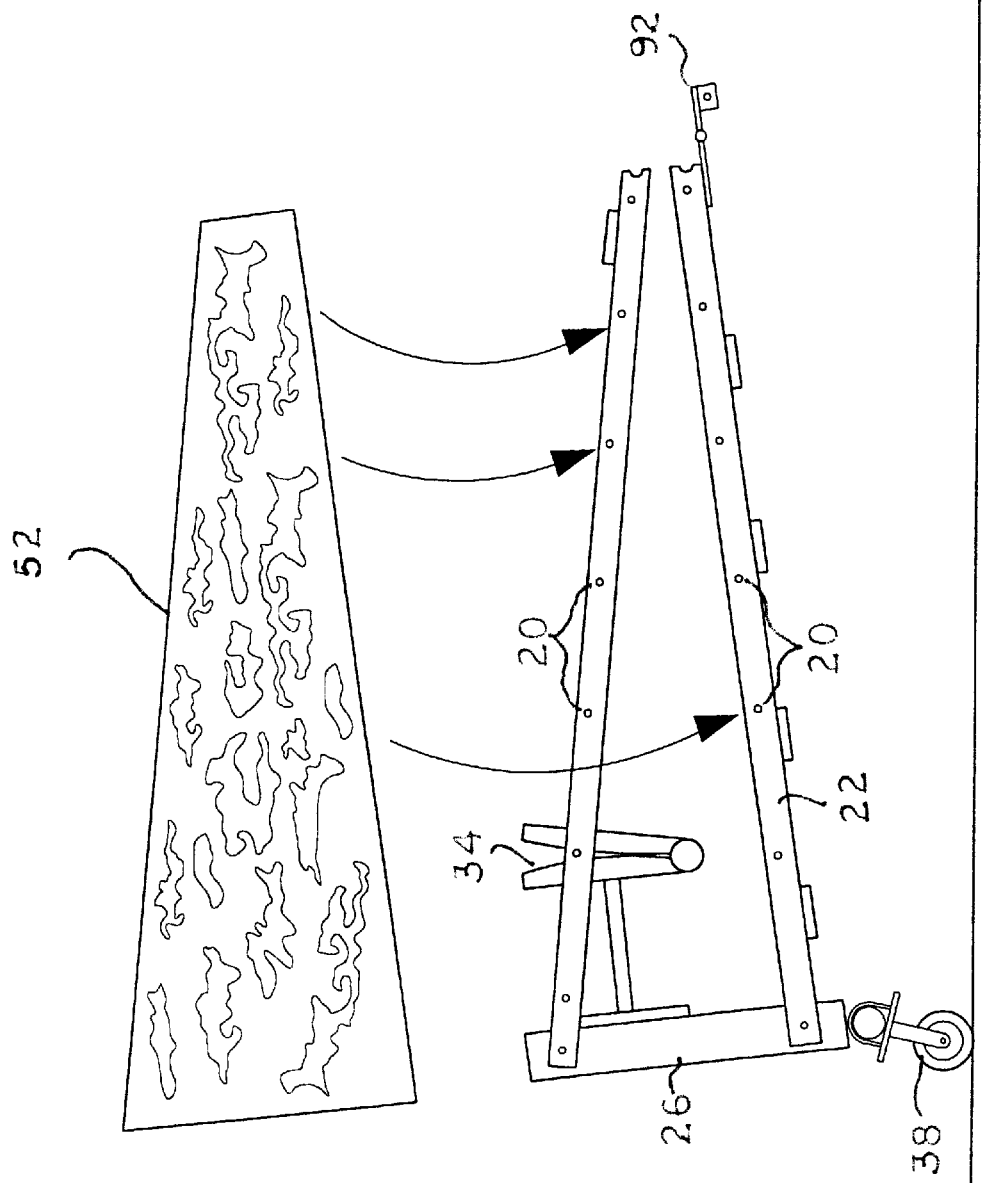
FIG. 11 is a partially exploded, side elevational view of the viewing apparatus with projected attachment of a pair of canvas side skirts (only one shown) by snaps.

In FIG. 10, the hoisting system 94 comprises a cable 96 attached to the end of the pivotable front frame or rail element 28 by a hook 98 on a ring fastener 100 on a crossbar 102. The opposite end of the cable 96 travels to a fold-up pulley system 104 attached to the front end of the ATV 14 and to a hand driven or electric winch 106 on the vehicle. This apparatus will erect the viewing perch 10.

Figure 12:
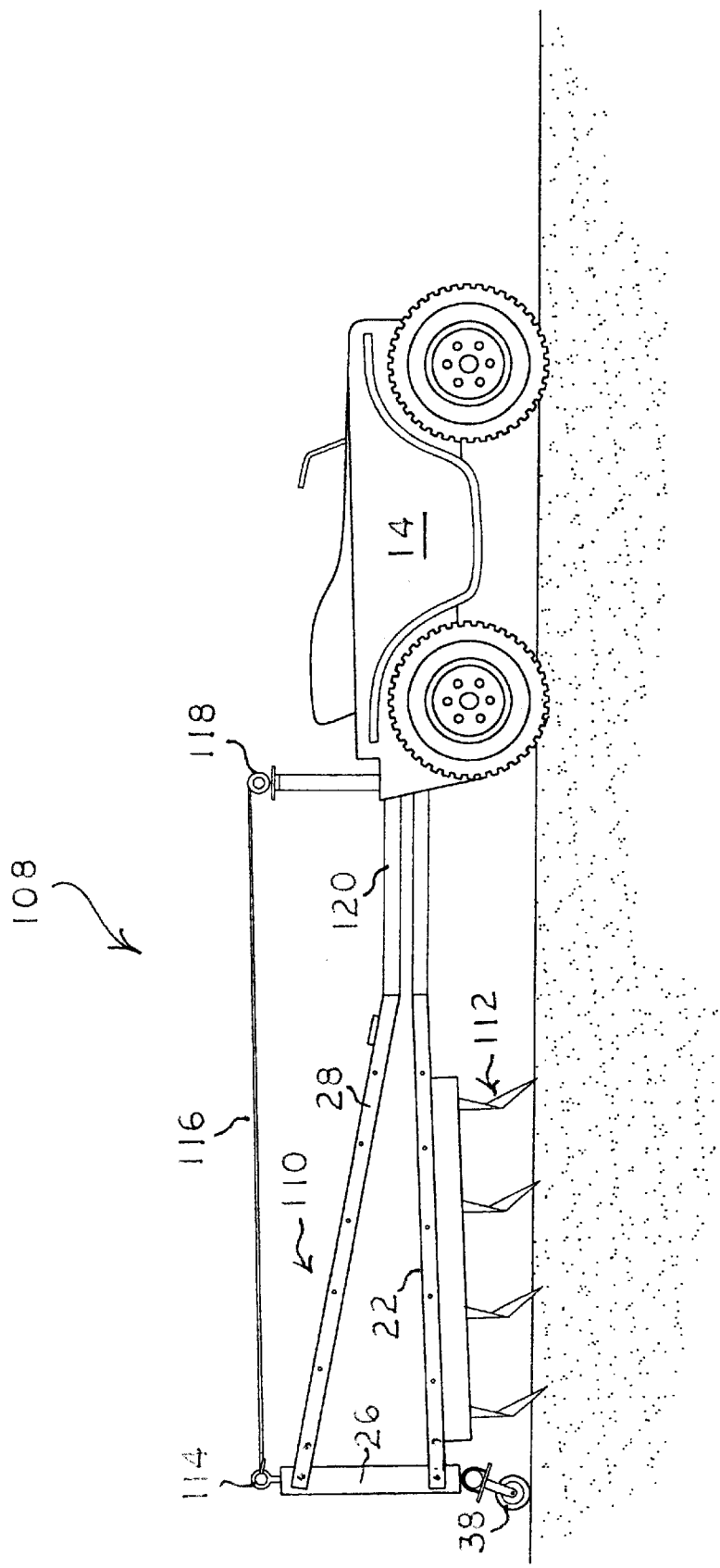
FIG. 12 is an environmental, side elevational view of the basic frame having a farm plow attached to an ATV as a sixth embodiment.

In FIG. 12, a sixth embodiment 108 is illustrated for the modification of the basic frame 108 lacking a seat to a farm plow 110 by attaching a plow element 112 on the ladder or base element 22. The platform 26 now supports a ringed fastener 114 on top and the pair of wheels 38. A steel cable 116 attached to the fastener 114 is attached to an electric winch 118 on the ATV 14. The cultivator 108 is attached to the ATV 14 by a hitch 120.

Figure 13:
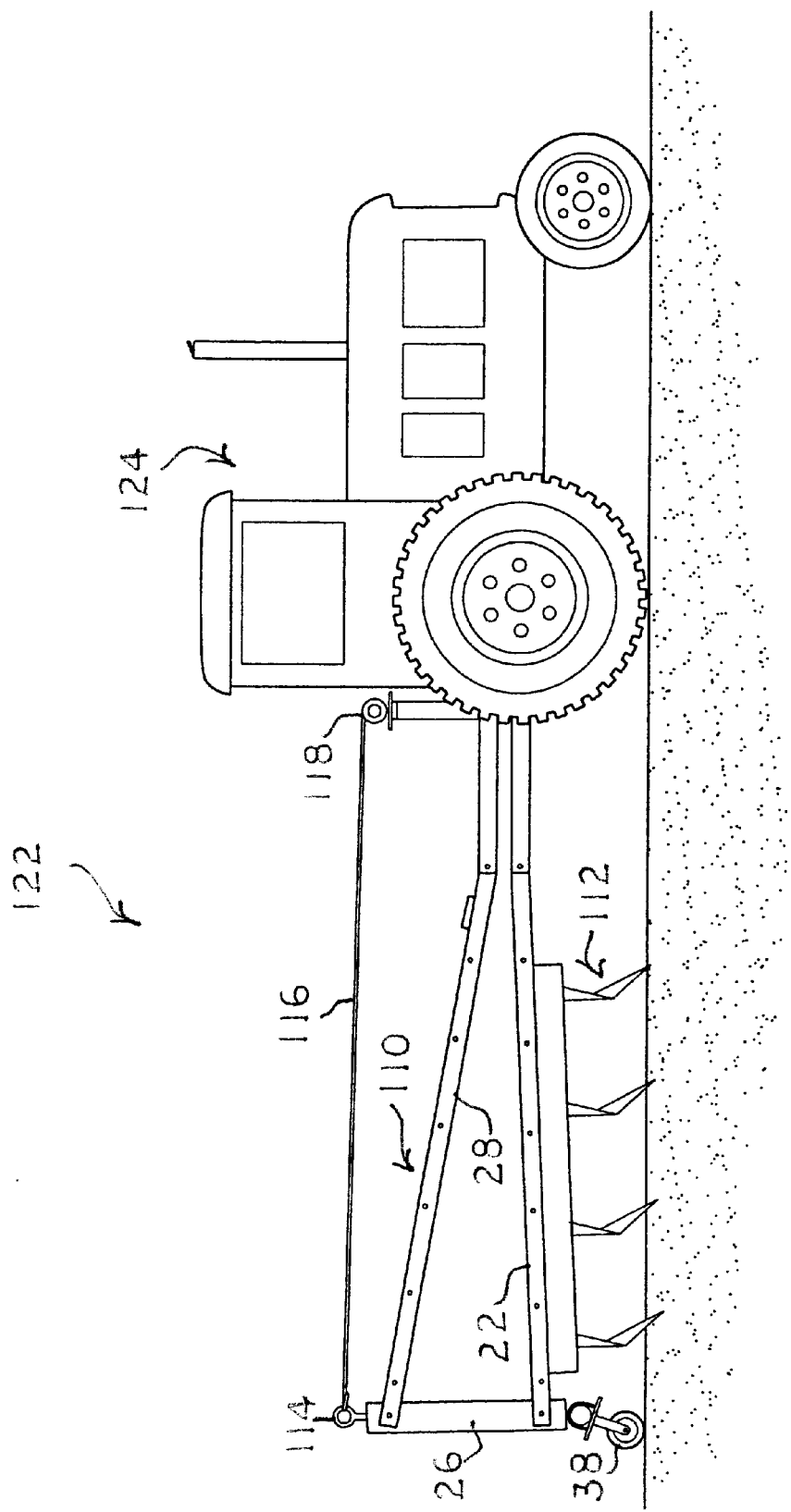
FIG. 13 is an environmental, side elevational view of the basic frame having a farm plow attached to a farm tractor as a seventh embodiment.

In FIG. 13, a seventh embodiment 122 is depicted with the same cultivator system as shown in FIG. 12 hitched to a farm tractor 124.

Figure 14:
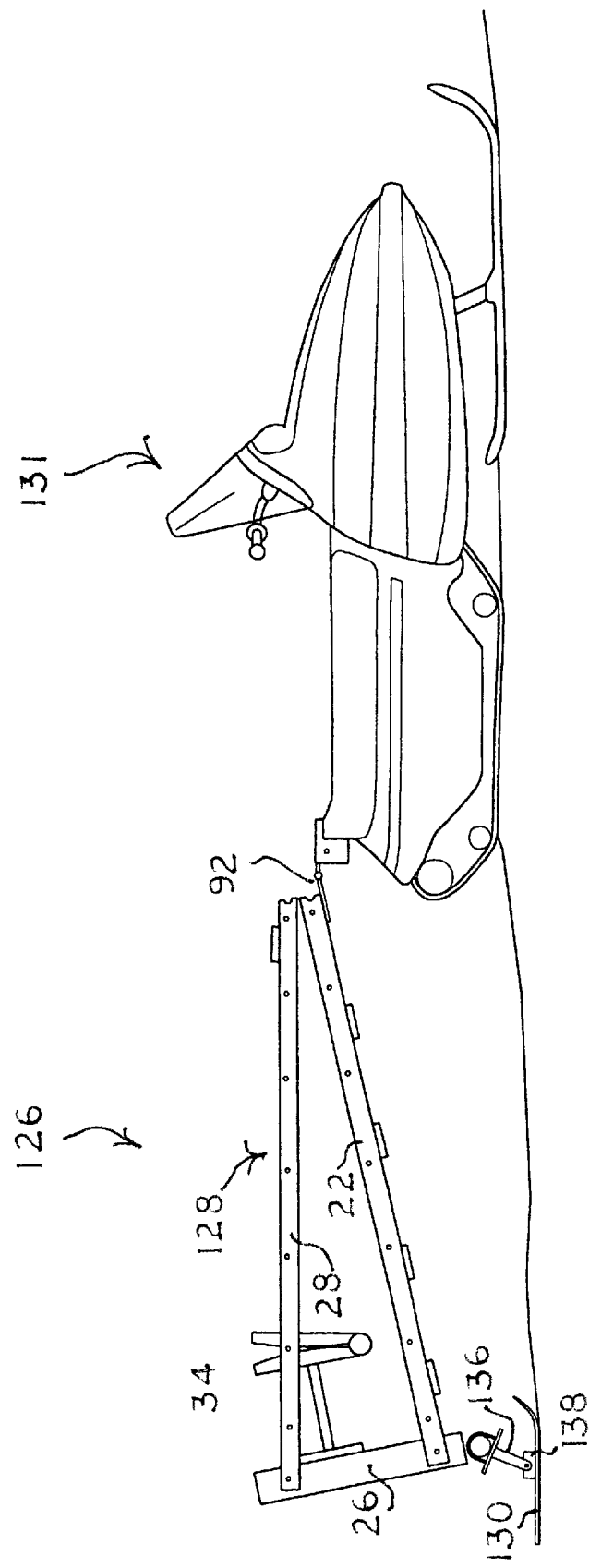
FIG. 14 is an environmental, side elevational view of the basic frame having skis attached to a snowmobile as an eighth embodiment.

In FIG. 14, an eighth embodiment 126 is illustrated with the basic frame 128 having the folded chair 34 and a pair of skis 130 connected to the wheel frame 136 by studs 138. A skimobile now pulls the basic frame 128 by a hitch 92.

Figure 15:
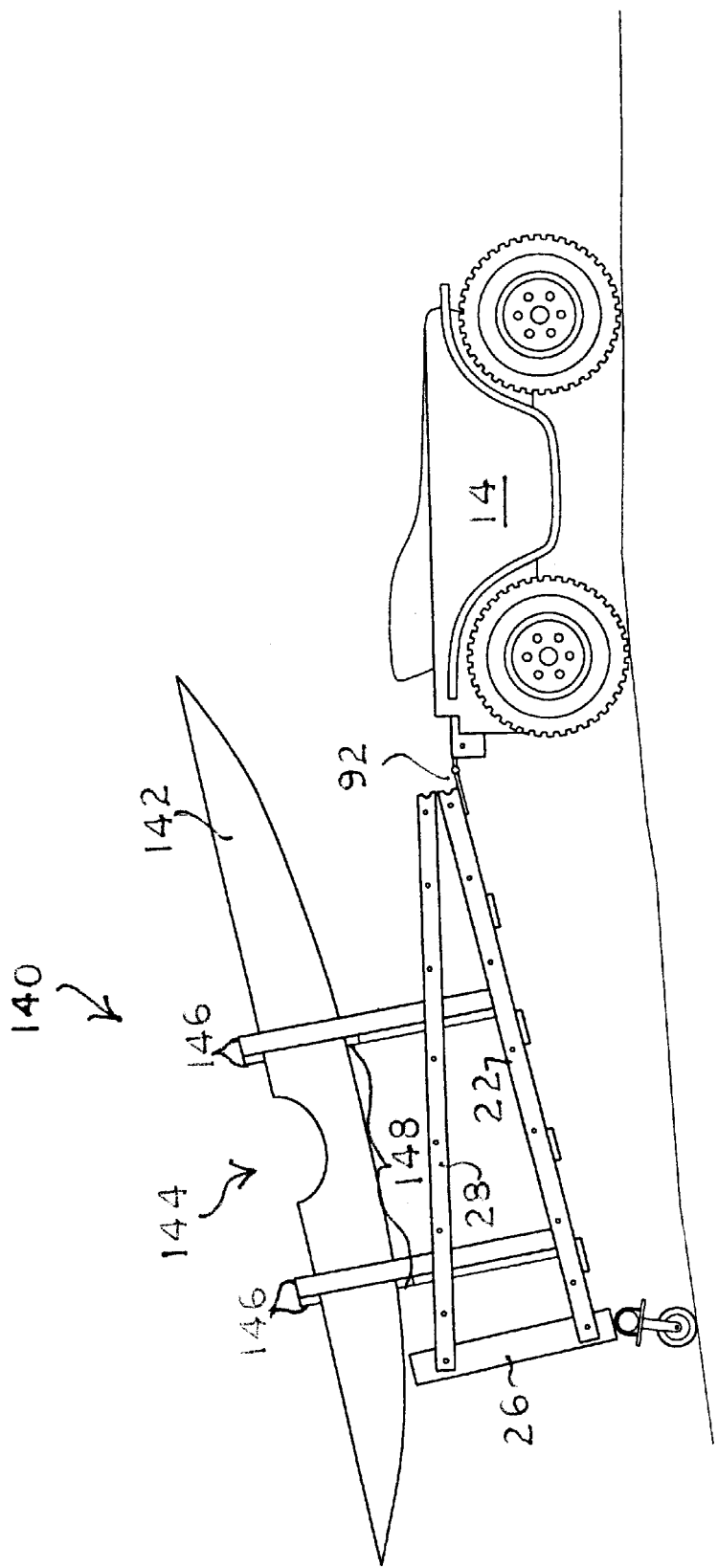
FIG. 15 is an environmental, side elevational view of the basic frame supporting a kayak on an added rack attached to a towing vehicle as a ninth embodiment.

In FIG. 15, a ninth embodiment 140 depicts a basic frame 108 without a folding seat and pulled on wheels 38 by an ATV 14. A kayak 142 is supported on a rack 144 comprising two pairs of posts 146 with a crossbar 148 between each pair of posts.

Thus, a utility perch and trailer combination apparatus attachable to open bed vehicles has been disclosed which can function as a viewing perch having a hoisting system supported by a vehicle or on the ground, an injured person, a luggage or kayak carrier, a tent with illumination, a pontoon boat with an inflator compressor, a shallow water fishing platform, and a support for a farm plow or skis.

It is to be understood that the present invention is not limited to the embodiments described above, but encompasses any and all embodiments within the scope of the following claims.

We claim:

1. A utility perch and trailer combination apparatus adaptable for an open bed vehicle comprising:
   an A-frame structure having a base element configured as a ladder having a plurality of steps, a rail element, and a rectangular floor plate joining said base element and rail element at one end;
   a folding chair on a standard attached on top of said floor plate;
   said rail element being pivotable on said floor plate, and said base element being fixed to said floor plate at an inside angle approximately 110°;
   a pair of wheels positioned on said floor plate adjacent said base element;
   the base element and the rail element having free ends; and
   the free ends of the utility perch and trailer combination apparatus adapted to be positioned on an open bed vehicle as a vertical viewing perch.

2. The combination apparatus according to claim 1, wherein said free ends of the base element and the rail element have notches for attachment to the front and rear bars of an all-track vehicle.

3. The combination apparatus according to claim 1, wherein said free ends of the base element have hinged male hitching elements.

4. The combination apparatus according to claim 1, wherein a canvas tent having a zippered vertical opening is configured to fit the floor plate of the combination apparatus and overlap the vehicle.

5. The combination apparatus according to claim 4, further comprising illumination inside the tent in the form of a pair of lamps energized by a vehicle's battery.

6. The combination apparatus according to claim 1, wherein a square canvas blind is attached to the periphery of the floor plate.

7. The combination apparatus according to claim 1, wherein the A-frame structure is adapted to be anchored to a ground surface by a pair of straps, there further being ring pins on the sides of the floor plate, the straps depending from said ring pins, and fastened to anchor stakes in the ground surface.

8. The combination apparatus according to claim 1, further comprising a wire mesh floor covering said base element.

9. The combination apparatus according to claim 8, further comprising an inflatable bed mattress configured to fit the wire mesh floor.

10. The combination apparatus according to claim 9, wherein the apparatus is dimensioned and configured to carry an injured person and luggage.

11. The combination apparatus according to claim 1, further comprising a trailer hitch attached to the free end of the base element from the center of a ladder step.

12. The combination apparatus according to claim 1, further comprising a floor board attached to the rail element to provide a fishing platform.

13. The combination apparatus according to claim 1, further comprising an elevating apparatus attachable to the A-frame and the front of a vehicle which elevates the utility perch onto the vehicle.

14. The combination apparatus according to claim 13, further comprising a winch and a fold-up pulley attachable on the front end of the vehicle for winding a cable assembly removably attached to a crossbar on the free end of the rail element.

15. A utility apparatus comprising:
 an A-frame structure having a base element configured as a ladder having a plurality of steps, a rail element, and a rectangular floor plate joining said base element and rail element;
 said rail element being pivotable on said floor plate and said base element being fixed to said floor plate at an inside angle approximately 110°;
 a wire mesh floor covering the base element;
 a pair of supporting means selected from the group consisting of wheels and skis, positioned on said floor plate adjacent said base element;
 the base element and the rail element having free ends, the free end of the base element having an attached trailer hitch;
 a rack of cultivator blades attachable to the base element;
 a pair of canvas sides having a trapezoidal shape, wherein the floor plate end and the free end are parallel; and
 said pair of canvas sides are attached to the A-frame: structure by snap fasteners.

16. The utility apparatus according to claim 15, wherein the pair of supporting means is a pair of skis.

17. The utility apparatus according to claim 15, further comprising a rack added to the A-frame to support a kayak.

18. The utility apparatus according to claim 15, further comprising inflatable pontoons attached to the sides of the A-frame structure for boating.

19. The utility apparatus according to claim 15, further comprising a rack of cultivator blades attached to the fixed base element.

20. The utility apparatus according to claim 15, wherein the pair of supporting means is a pair of wheels.

* * * * *